(12) United States Patent
Muller et al.

(10) Patent No.: US 8,596,077 B2
(45) Date of Patent: Dec. 3, 2013

(54) MAGNETOCALORIC THERMAL GENERATOR HAVING HOT AND COLD CIRCUITS CHANNELED BETWEEN STACKED THERMAL ELEMENTS

(75) Inventors: Christian Muller, Strasbourg (FR); Jean-Louis Dupin, Muntzenheim (FR); Jean-Claude Heitzler, Horbourg-Wihr (FR); Georges Nikly, Illkirch-Graffenstaden (FR)

(73) Assignee: Cooltech Applications Societe par Actions Simplifiee, Holtzheim (FR)

( * ) Notice: Subject to any disclaimer, the term of this patent is extended or adjusted under 35 U.S.C. 154(b) by 1164 days.

(21) Appl. No.: 12/306,817

(22) PCT Filed: Jul. 9, 2007

(86) PCT No.: PCT/FR2007/001171
§ 371 (c)(1),
(2), (4) Date: Dec. 29, 2008

(87) PCT Pub. No.: WO2008/012411
PCT Pub. Date: Jan. 31, 2008

(65) Prior Publication Data
US 2009/0320499 A1    Dec. 31, 2009

(30) Foreign Application Priority Data
Jul. 24, 2006 (FR) ...................... 06 06750

(51) Int. Cl.
*F25B 21/00* (2006.01)
(52) U.S. Cl.
USPC .............................. 62/3.1; 62/467
(58) Field of Classification Search
USPC .................................... 62/3.1, 467
See application file for complete search history.

(56) References Cited

U.S. PATENT DOCUMENTS

| | | | | |
|---|---|---|---|---|
| 2,804,284 A | * | 8/1957 | Otten | 165/166 |
| 3,305,005 A | * | 2/1967 | Grover et al. | 165/104.26 |
| 4,408,468 A | * | 10/1983 | Alefeld et al. | 62/476 |
| 4,416,261 A | * | 11/1983 | van der Aa | 126/635 |
| 4,642,994 A | | 2/1987 | Barclay et al. | |
| 4,917,181 A | * | 4/1990 | Kiernan et al. | 165/166 |

(Continued)

FOREIGN PATENT DOCUMENTS

| | | |
|---|---|---|
| FR | 2864211 A1 | 6/2005 |
| FR | 05/08963 | 9/2005 |

OTHER PUBLICATIONS

Epoxies, Etc.; Thermally Conductive Resins; Apr. 9, 2005; http://www.epoxies.com/therm.htm.*

Primary Examiner — Cheryl J Tyler
Assistant Examiner — Orlando E Aviles Bosques
(74) Attorney, Agent, or Firm — Davis & Bujold, PLLC; Michael J. Bujold (57) ABSTRACT

The thermal generator (1) which comprises at least one thermal module (10) constituted from many thermal elements (40), stacked and arranged in order to delimit channels therebetween for circulation of heat transfer fluid. These channels are divided into hot channels, in which the heat transfer fluid of the hot circuit flows, and cold channels, in which the heat transfer fluid of the cold circuit flows. The hot and cold channels are alternated between the thermal elements (40) and the thermal elements have fluid inlet and outlet orifices which communicate with one another so as to distribute the flow of heat transfer fluid of each hot and cold collector circuit, respectively, in the corresponding hot and cold channels.

27 Claims, 12 Drawing Sheets

(56) References Cited

U.S. PATENT DOCUMENTS 5,398,751 A * 3/1995 Blomgren ............... 165/166
5,444,983 A * 8/1995 Howard ................. 62/3.1
2004/0093877 A1 * 5/2004 Wada et al. .............. 62/114
2004/0182086 A1 * 9/2004 Chiang et al. ............ 62/3.1
2007/0199332 A1    8/2007 Muller et al.
2008/0236172 A1   10/2008 Muller et al.

* cited by examiner

MAGNETOCALORIC THERMAL GENERATOR HAVING HOT AND COLD CIRCUITS CHANNELED BETWEEN STACKED THERMAL ELEMENTS

TECHNICAL FIELD

The present invention concerns a magneto-calorific thermal generator comprising thermal elements based on magneto-calorific material, magnetic means arranged in order to create a variation in magnetic field in the said thermal elements and make their temperature vary, at least two separate collector circuits, a collector circuit referred to as "hot" and a collector circuit referred to as "cold", in each of which circulates a separate heat transfer fluid arranged to collect respectively the calories and frigories emitted by the said thermal elements depending on their functional cycle, and means of connecting the said collector circuits to external circuits designed to use the said calories and frigories collected.

PRIOR ART

The new thermal generators which use the magneto-calorific effect of certain materials offer a very interesting ecological alternative to the conventional generators which are destined to disappear in a context of sustainable development and reduction of the greenhouse effect. However, in order to be economically viable and provide good thermal efficiency, the design of such generators and of their means of recovering the calories and frigories emitted by these materials is vitally important, bearing in mind the very short cycle times, the small temperature gradients generated and the limited magnetic intensity. The energy recovered is closely linked to the mass of the magneto-calorific material, the intensity of the magnetic field and the exchange time with the heat transfer fluid. It is known that the transfer factor of a heat exchanger is linked to the exchange surface area relative to the flow rate of the heat transfer fluid in contact with the exchange surface. Because of this, the greater the exchange surface area the higher the transfer coefficient.

In the known generators, a collector circuit is used as the means of recovery, this circuit traversing the thermal elements in which flows a single heat transfer fluid which alternately feeds a cold circuit and a hot circuit. As a result this solution creates a high thermal inertia which considerably penalises the energy efficiency of the generator.

French patent application no. 05/08963 filled by the present applicant proposes a new generator design in which the thermal elements are traversed by two separate collector circuits, a hot collector circuit and a cold collector circuit, in each of which circulates a separate heat transfer fluid. Each thermal element takes the form of an insert of prismatic shape constituted from a stack of ribbed plates made in magneto-calorific material, delimiting between each other passages for the circulation of the heat transfer fluid in a manner that creates two separate collector circuits. These thermal inserts are mounted in a plate provided with suitable housings and conduits connecting the corresponding collector circuits of the different thermal inserts. This solution has the advantage of eliminating the thermal inertia of the heat transfer fluid, given that there is one fluid for the hot circuit and one fluid for the cold circuit, and of increasing the exchange surface area and hence the thermal efficiency of the generator. It presents, however, the disadvantage of being difficult to industrialise, very costly and of non-modular configuration.

DESCRIPTION OF THE INVENTION

The present invention attempts to overcome these disadvantages by proposing a magneto-calorific thermal generator which is compact and multi-purpose, has high energy efficiency and a maximal transfer coefficient, while being easy to industrialise at reasonable cost and having a modular configuration enabling it to respond to a wide range of both industrial and domestic applications.

For this purpose, the invention concerns a thermal generator of the type mentioned in preamble, characterised in that it comprises at least one thermal module constituted from many thermal elements, stacked and arranged in order to delimit between each other channels for the circulation of heat transfer fluid, these channels being divided into hot channels in which the heat transfer fluid of the hot circuit flows and cold channels in which the heat transfer fluid of the cold circuit flows, and in that the said thermal elements have fluid inlet and outlet orifices which communicate with each other so as to distribute the flow of heat transfer fluid of each hot and cold collector circuit respectively in the corresponding hot and cold channels.

This staged construction allows the creation of thermal sub-assemblies, so-called thermal modules, possessing parallel channels, these thermal modules being connectable together in series and/or in parallel. This construction enables the number of stacked thermal elements per thermal module to be varied according to the required rate of fluid flow, and the number of juxtaposed thermal modules to be varied according to the required temperature range, providing very great modularity.

BRIEF DESCRIPTION OF DRAWINGS

The present invention and its advantages will be more apparent from the following description of several embodiments given as a non-limiting example and referring to the attached drawings, in which:

FIG. 18A is a perspective view of a first implementation variant of a thermal module according to the invention, FIG.

18B is a view of a sub-assembly of this module and FIG. 18C is a view of the detail H of FIG. 18B;

ILLUSTRATIONS OF THE INVENTION

Figure 1:
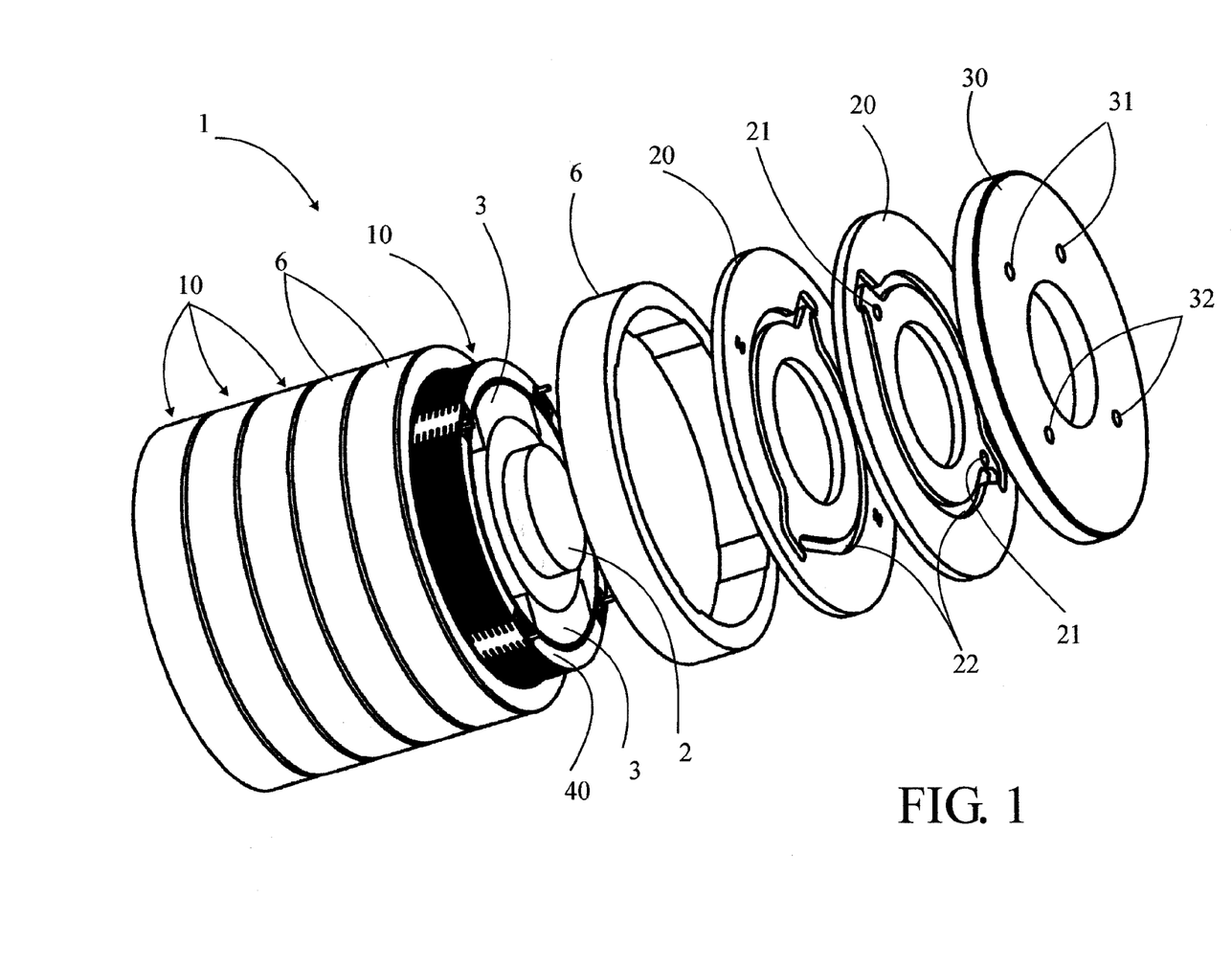
FIG. 1 is an exploded view of a thermal generator according to the invention.

Referring to FIG. 1, the thermal generator 1 according to the invention comprises a set of six stacked thermal modules 10, connected by distributor discs 20 and closed by sealing flanges 30. The number and construction of the thermal modules 10 are variable depending on the desired performance. The sealing flange 30 represented has four orifices 31 and 32, with two feed orifices 31 and two discharge orifices 32, designed to be connected to an external hot circuit and to an external cold circuit (not represented) which respectively use the calories and frigories produced by this generator 1. According to requirements, the connection can be done on a single side or on both sides of the generator 1. The distributor discs 20 have orifices 21 and distribution grooves 22 allowing the connection together in series, in parallel, or in a series/parallel combination of the hot and cold collector circuits of the different thermal modules 10 and connection with external hot and cold circuits. These distributor discs 20 can be arranged in pairs, each disc being dedicated to one of the collector circuits as in FIGS. 1 and 4. They may also be formed from double-sided single discs (not represented) with a particular arrangement of orifices 21 and distribution grooves 22 in order to implement the same function.

In the example of FIG. 1, this thermal generator 1 has a shaft 2 which rotates or moves axially, carrying two diametrically-opposed magnetic assemblies 3, this shaft being driven by any known type of actuator (not represented) giving continuous, discontinuous, sequential or reciprocating motion. The number, position and type of the magnetic assemblies 3 can be modified and determined according to the construction of the thermal modules 10. These magnetic assemblies 3 can be formed from permanent magnets, electromagnets, superconducting magnets or any other type of magnet. The preferred choice is permanent magnets due to their advantages in terms of size, simplicity of use and low cost. The permanent magnets may be solid, sintered, glued or laminated, associated with one or more magnetisable materials which concentrate and direct their magnetic field lines. The thermal modules 10 can be housed in an inner sleeve 4 and an outer sleeve 5 (see FIG. 5) to provide additional sealing. In this case, the extremities of these sleeves 4 and 5 are coupled to the sealing flange 30 by seals 33. The inner sleeve 4 and/or the outer sleeve 5 can be deleted if the construction of the thermal modules 10 is such that it enables sufficient sealing to be obtained.

The thermal modules 10 can be surrounded by an armature 6 made preferably from a ferromagnetic material of which the main function is to close the magnetic flux generated by the magnetic assemblies 3. In an implementation variant which is not represented, the magnetic flux generated by the magnetic assemblies 3 can be closed by additional mobile or static magnetic assemblies located at the outer periphery. The thermal modules 10 can be assembled by tightening using any known means such as for example tie rods 34 (see FIG. 5) extending between the two sealing flanges 30, or clamps (not represented) mounted on the shaft 2 by means of bearings. Any other mode of assembly can be envisaged, the essential factor being to mechanically support the thermal modules between each other and to seal the internal hot and cold collector circuits of the generator.

In the different examples illustrated, the thermal generator 1 presents a circular configuration i.e. the thermal modules are annular and arranged around a shaft 2 carrying the magnetic assemblies 3. The invention also extends to a thermal generator having a rectilinear configuration (not represented) in which the thermal elements are arranged in a linear manner and the magnetic means are driven in a reciprocating or sequential movement.

Figures 2, 3:
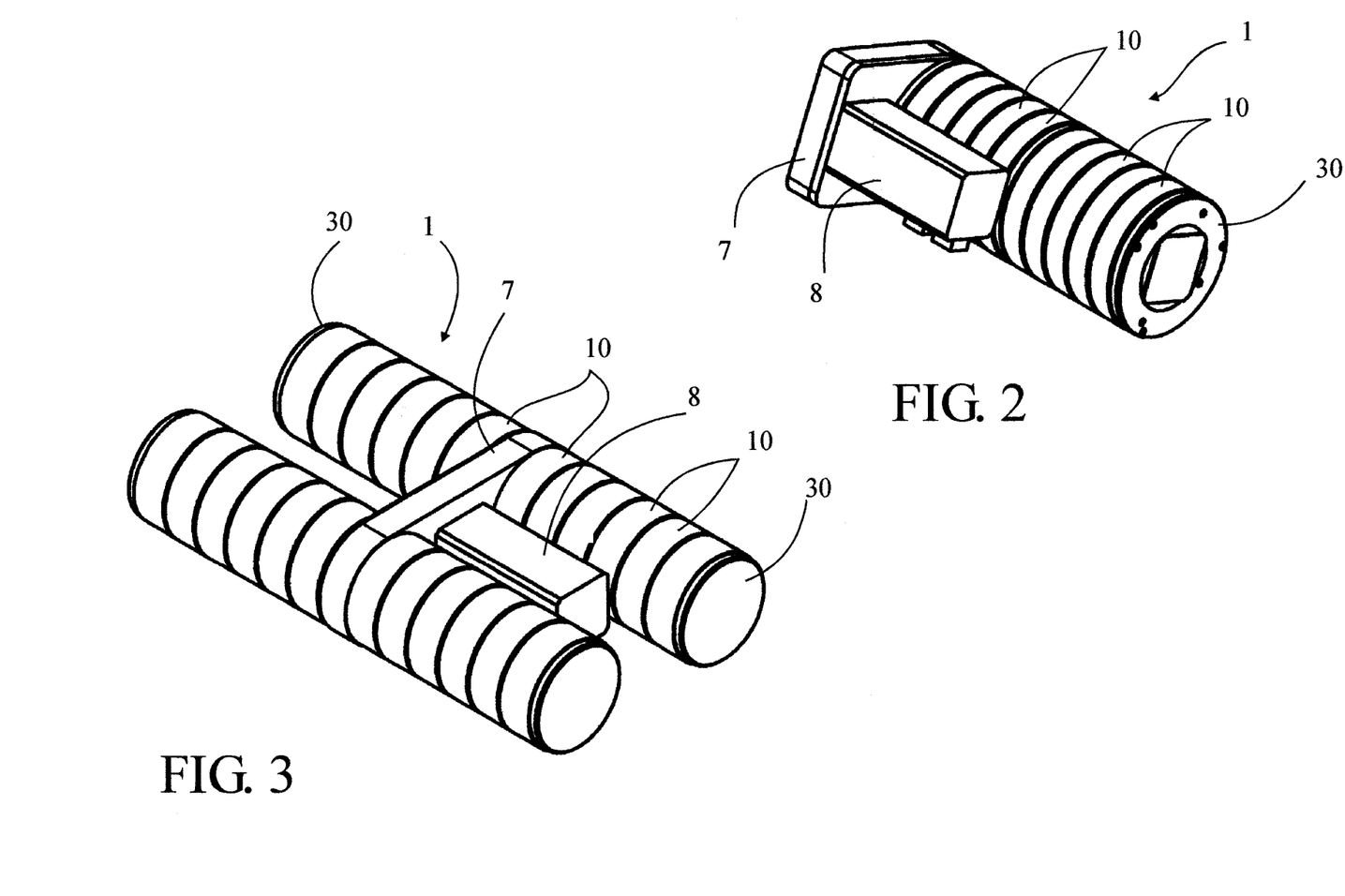
FIGS. 2 and 3 are perspective views of two examples of the configuration of the generator in FIG. 1.

The thermal modules 10 can be mounted on a base 7, as illustrated in FIG. 2, by any known means. In this example the thermal generator 1 comprises two assemblies of five thermal modules 10 connected by distributor discs 20 (not visible) and closed by sealing flanges 30. The base 7 carries an actuator 8 arranged in parallel and coupled to the shaft of the generator by any known type of transmission (not represented). The actuator 8 can be arranged in line with and directly coupled to the shaft 2. In FIG. 3, the thermal generator 1 comprises four assemblies, each of six thermal modules 10, mounted head to foot on a base 7. A single actuator 8 is coupled to the shafts 2 of each assembly by any known type of mechanical transmission (not represented). These examples give an idea of the various possible configurations. Because of its modular construction, the thermal generator 1 according to the invention is infinitely configurable according to the desired heating or cooling capacity and the fluid flow rate necessary for each application envisaged. The actuator 8 can be constituted by any system generating a mechanical torque e.g. a windmill, hydraulic turbine, internal combustion engine, electric motor, motor based on animal or muscular energy, rotary actuator or other device. In the case of an electric actuator, the energy may come from a photoelectric transducer, a solar cell, a windmill, mains electricity, a generator or other device.

Figures 4, 5:
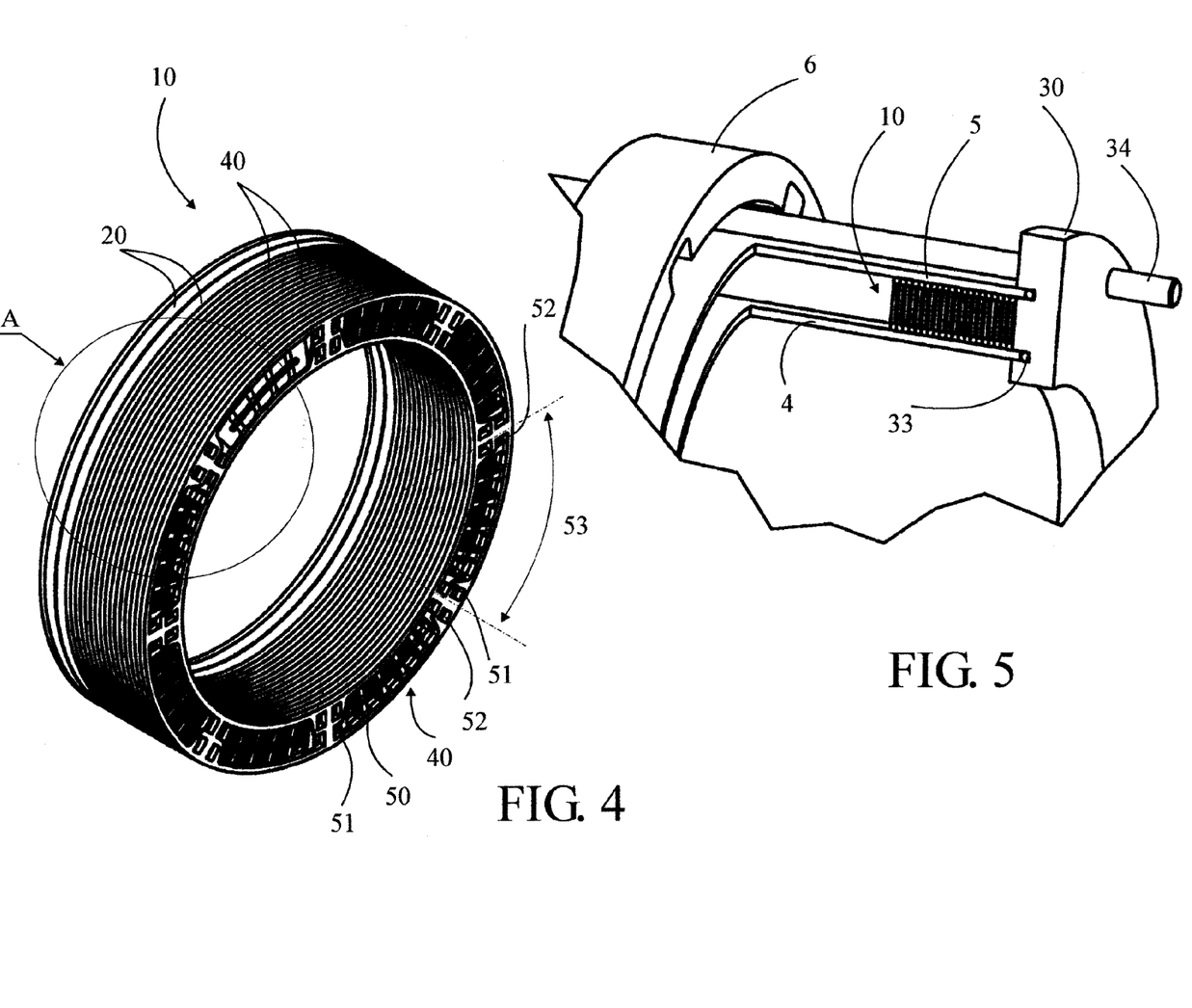
FIG. 4 is a perspective view of a thermal module entering into the composition of the generator in FIG. 1.
FIG. 5 is a detailed view in partial section of one extremity of the generator in FIG. 1.
Figure 6A:
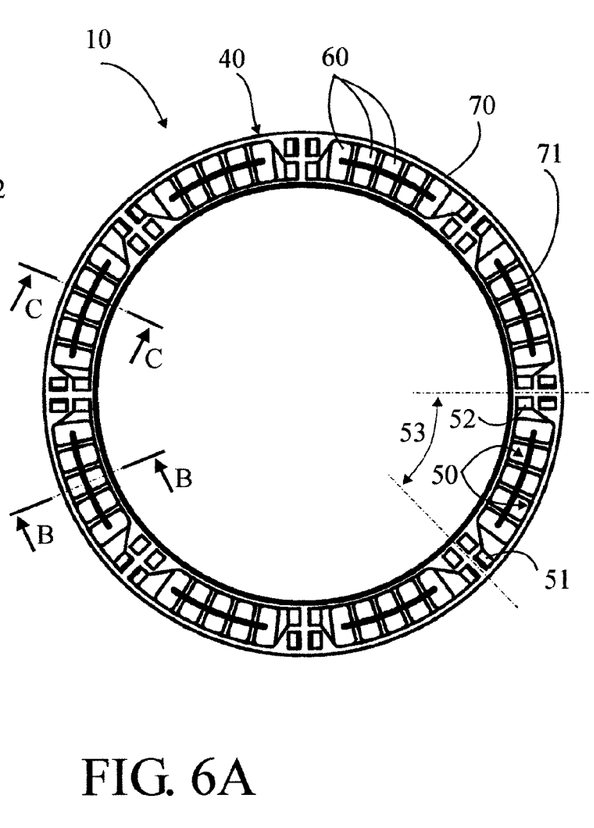
FIG. 6A is a front view of the thermal module in FIG. 4.
Figure 6B:
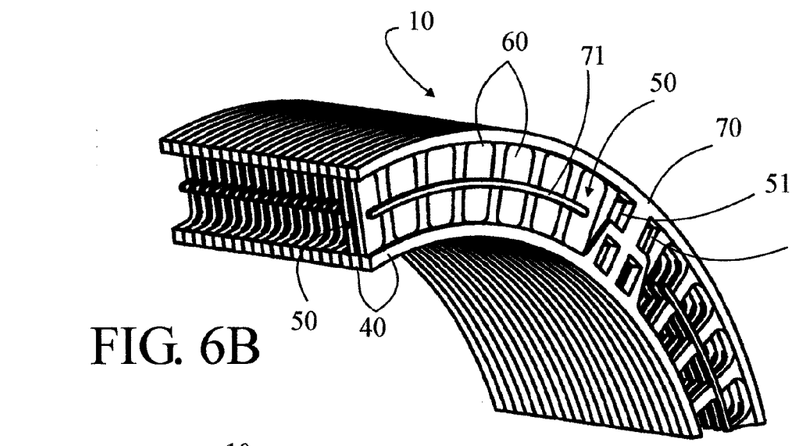
FIG. 6B is an enlarged perspective view of detail A of FIG. 4
Figure 6C:
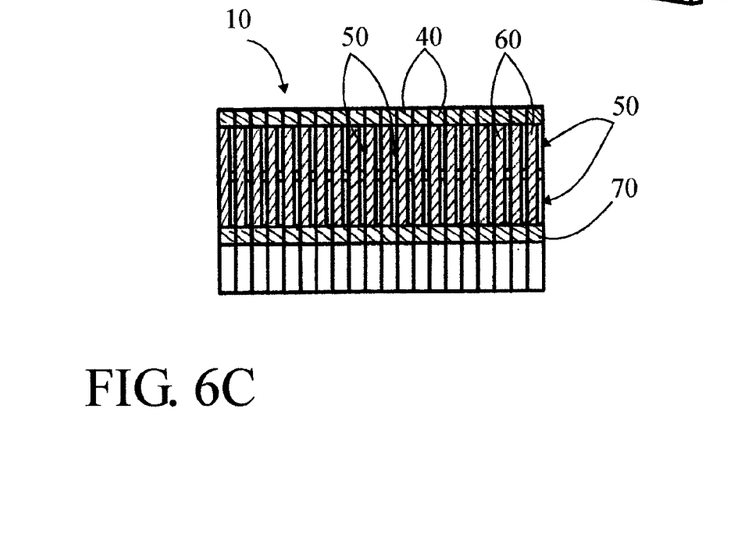
FIG. 6C is a plan view of the edge of FIG. 6B.

Each thermal module 10 is constituted from a number N of thermal elements 40 of identical or complementary geometry enabling them to be stacked. An example of a thermal module is illustrated in FIG. 4 and comprises seventeen thermal elements 40 in the form of flat rings stacked axially. These thermal elements 40 are detailed in FIGS. 6A-C and 7 A-C and have the characteristic of delimiting between them channels 50 for the circulation of a heat transfer fluid, these being so-called hot channels in which the fluid of the hot collector circuit flows and so-called cold channels in which the fluid of the cold collector circuit flows. These hot and cold channels 50 alternate between the thermal elements 40 such that each thermal element 40 has on one side a hot channel 50 and on the other side a cold channel 50. These channels 50 have a low thickness ranging for example from 0.01 to 10 mm and preferably from 0.15 to 1.5 mm for the purposes of generating a flow which is laminar or of low turbulence with or without fluid vortices, such that a current of hot heat transfer fluid flows between two adjacent thermal elements 40 and a current of cold heat transfer fluid flows between the next two. These thermal elements 40 have inlet orifices 51 and outlet orifices 52 placing in communication the channels 50 of a given collector circuit in a parallel configuration. These thermal elements 40 can also be divided into several separate thermal sectors 53, identical or not, each having a channel 50, an inlet orifice 51 and an outlet orifice 52, so as to create parallel circuits in each current of fluid. In this way the flow of heat transfer fluid in each collector circuit is divided a first time by the number S/2 of thermal sectors 53 then a second time by the number N/2 of thermal elements 40 stacked. This staged distribution of the flow of heat transfer fluid allows a considerable reduction in the flow rate and speed of the current of fluid in each channel 50, this increasing the transfer coefficient and simultaneously reducing energy losses.

In a version which is not represented, spacer plates can be inserted between the thermal elements 40 in order to delimit the channels 50 and provide sealing, for example sheets of Teflon® or similar.

Figure 7A:
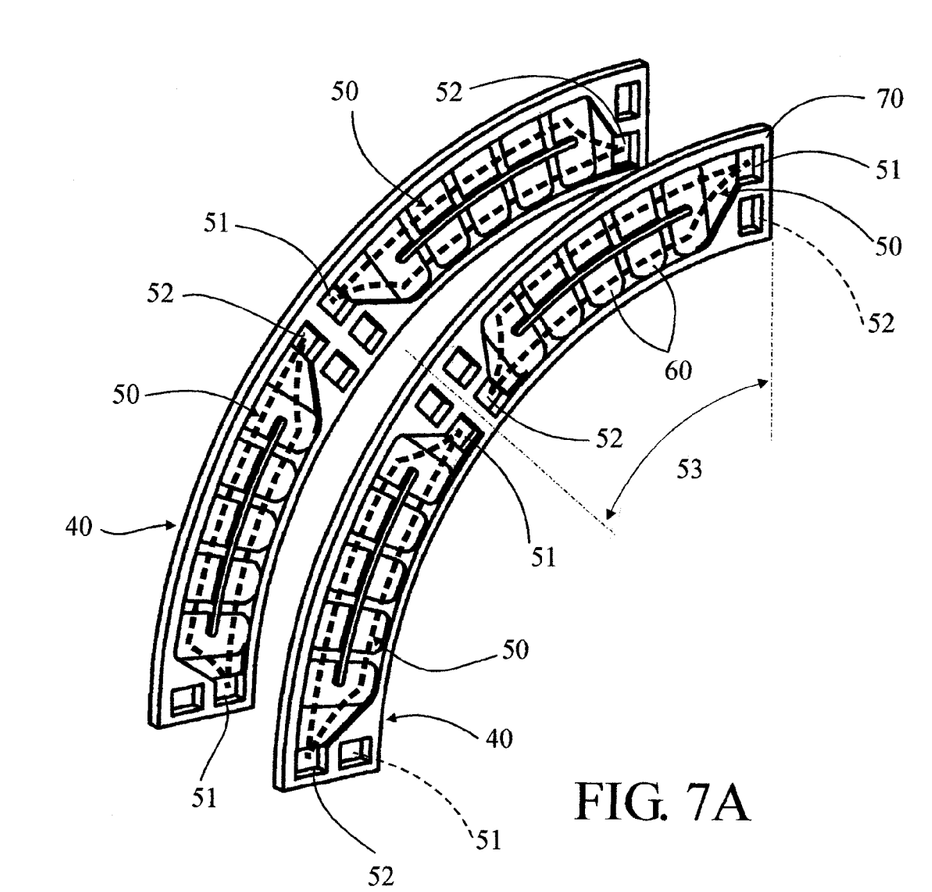
FIG. 7A is a partial view of two thermal elements of the module in FIG. 4 showing two thermal sectors and FIGS. 7B and 7C are sectional views according to the lines BB and CC of a thermal element in FIG. 6A.

In the example in FIGS. 4, 6A-C and 7A-C, the thermal elements 40 of the thermal module 10 are divided into eight identical thermal sectors 53 extending over approximately 45°. FIG. 7A shows the passage of heat transfer fluid in the thermal sectors 53 of two adjacent thermal elements 40. Each thermal sector 53 has four orifices: an inlet orifice 51 and an outlet orifice 52 traversing and communicating with its channel 50 and an inlet orifice 51 and an outlet orifice 52 traversing in order to communicate with the channel 50 of the next thermal element 40. Depending on the angular position of the magnetic assemblies 3 in relation to the thermal module 10, the heat transfer fluid circulating in the channels 50 of the different thermal sectors 53 is active or passive. In the thermal sectors 53 subjected to the magnetic field, the heat transfer fluid of the hot collector circuit is active and, in the other thermal sectors 53 not subjected to the magnetic field, the heat transfer fluid of the cold collector circuit is active. At the same time, the heat transfer fluid of the cold and hot collector circuits in those same sectors are passive.

In this example, each thermal element 40 has many thermally conducting inserts carried by a support 70, the inserts 60 occupying the majority of the area of the support 70. The inserts 60 have the shape of a circular sector and are made for example from a cut, machined or cast magneto-calorific material. The term "magneto-calorific material" means a material made partly or entirely from a magneto-calorific substance such as for example gadolinium (Gd), an alloy of gadolinium containing for example silicon (Si), germanium (Ge), an alloy of manganese containing for example iron (Fe), magnesium (Mg), phosphorus (P), an alloy of lanthanum, an alloy of nickel (Ni), any other equivalent magnetisable material or alloy, or a combination of different magneto-calorific materials, presented in the form of powder, particles, a solid or porous block, an assembly of stacked grooved plates forming mini- or micro-channels. The choice between these magneto-calorific materials is made according to the required heating or cooling power and the necessary temperature ranges.

The support 70 can be flexible or rigid and made from natural or synthetic materials, with or without fillers, such as for example thermoplastics, elastomers, resins or any other thermally insulating material. It can be obtained by machining, 3D printing by stereo lithography, etching, casting, injection or similar processes. It is preferably overmoulded around inserts of which the front and rear faces remain visible. The support 70 is arranged to combine several functions: a function for maintaining the inserts 60, a function as a spacer between the stacked thermal elements 40 in order to guarantee the thickness of the channels 50, a function for sealing between the said thermal elements 40 when they are stacked and if required an indexing and/or locating function in order to facilitate the assembly and positioning of the thermal elements 40 between each other. In a variant which is not represented, the support can be filled with particles or fibres of magneto-calorific material in order to add a thermal function.

Figures 7B, 7C:
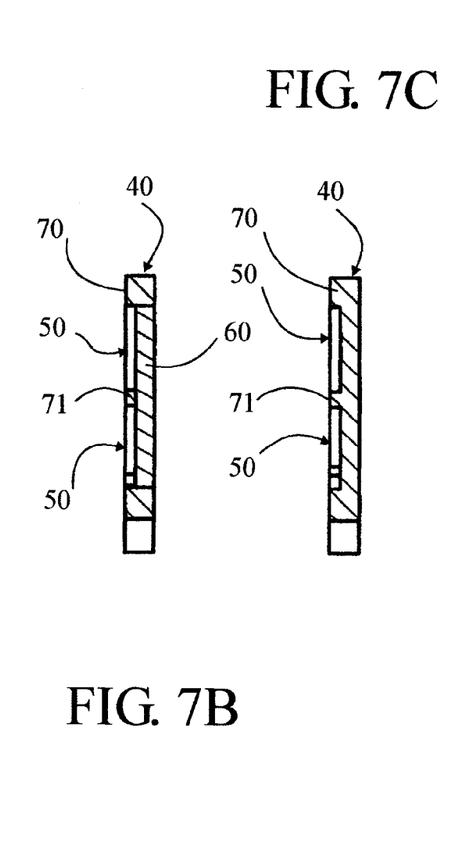

The thermal element 40 of annular shape is represented in detail in FIG. 7A and in section in FIGS. 7B and 7C. It presents an approximately rectangular section and has recessed areas on its front face forming the channel 50 for the circulation of a first heat transfer fluid and a flat area on its rear face closing the channel 50 of the next thermal element 40 for the circulation of the second heat transfer fluid. In this case, the channel 50 is delimited at the bottom by the front face of the inserts 60 and on the sides by the edges of the support 70. The flat rear face of the thermal element 40 is delimited by the rear face of the inserts 60 and the support 70. The front face of the support 70 may have one or more continuous or discontinuous central ribs 71 which separate the channel 50 into at least two parts in order to improve the distribution of fluid over the whole surface of the inserts 60. In another implementation variant which is not represented, the support 70 may have recessed areas forming the channel 50 for the circulation of the hot and cold heat transfer fluids on its front and rear faces. The front and rear faces of the support 70 form the sealing surfaces ensuring sealing of the channels 50 when the thermal elements 40 are stacked in a tight arrangement. It is clear that any other way of fulfilling the same functions may be suitable. It is also possible to vary the thickness of certain zones of the support 70 and/or the thickness of the inserts 60 in order to influence the thickness of the fluid current and hence its speed of flow.

Figure 10A:
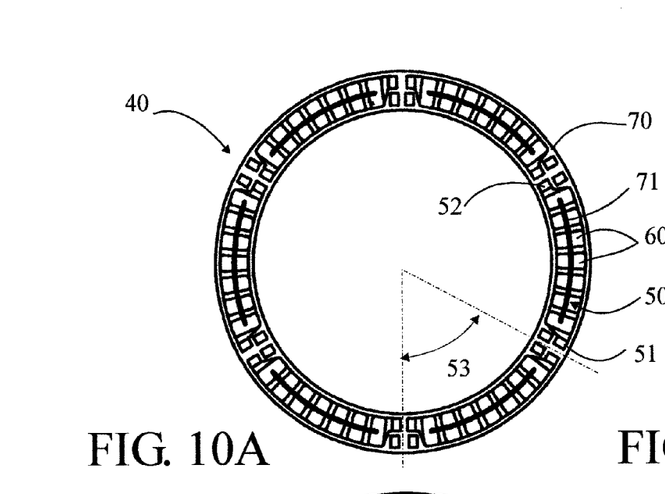
FIGS. 10A, 10B, 11A and 11B are front and rear views of two implementation variants of a thermal element according to the invention.
Figures 10B, 11B:
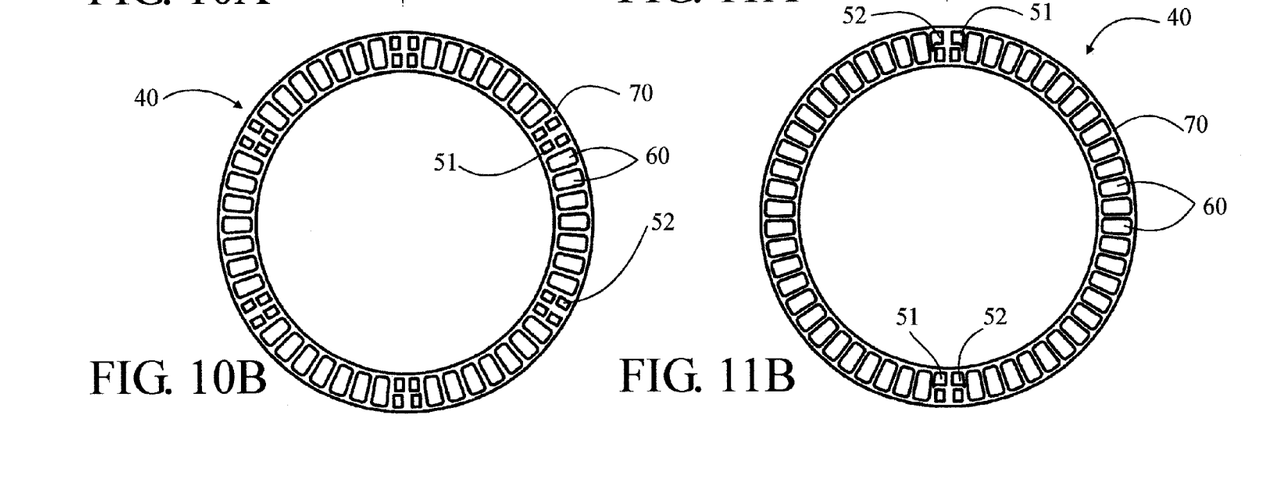
Figure 11A:
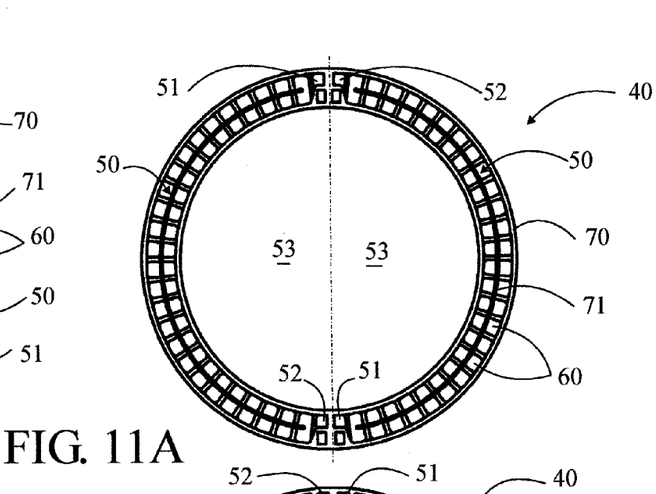
Figure 12:
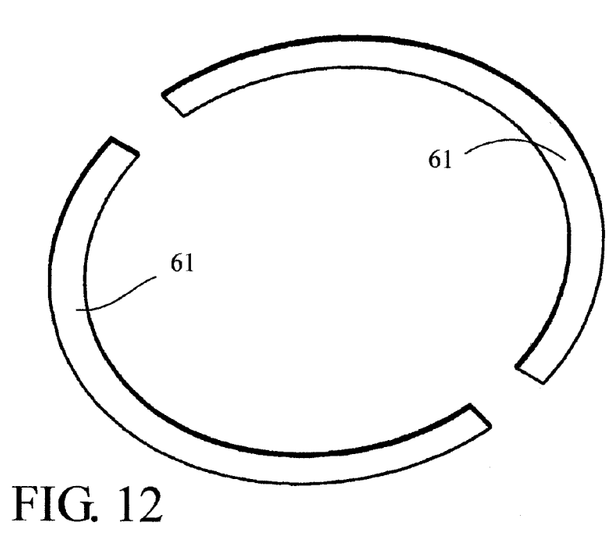
FIGS. 12 and 13 are variants of magneto-calorific parts.
Figure 13:
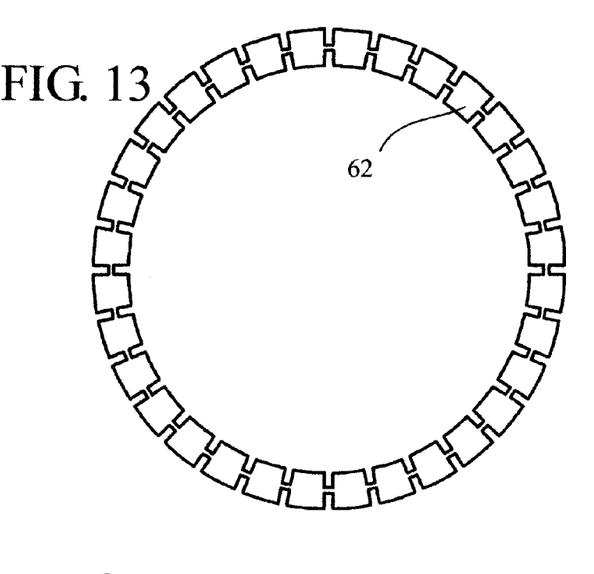
Figure 14:
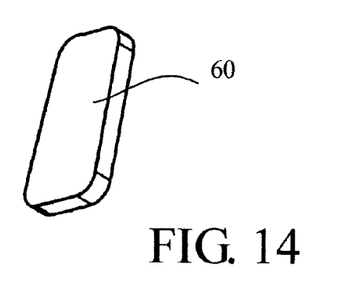
FIGS. 14 and 15 are variants of magneto-calorific inserts.
Figure 15:
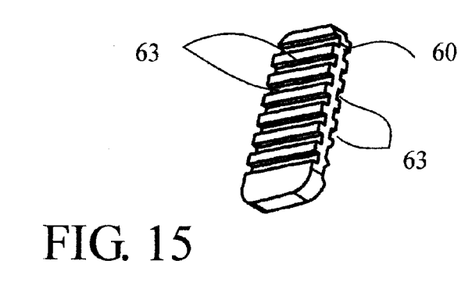
Figures 16A, 16B:
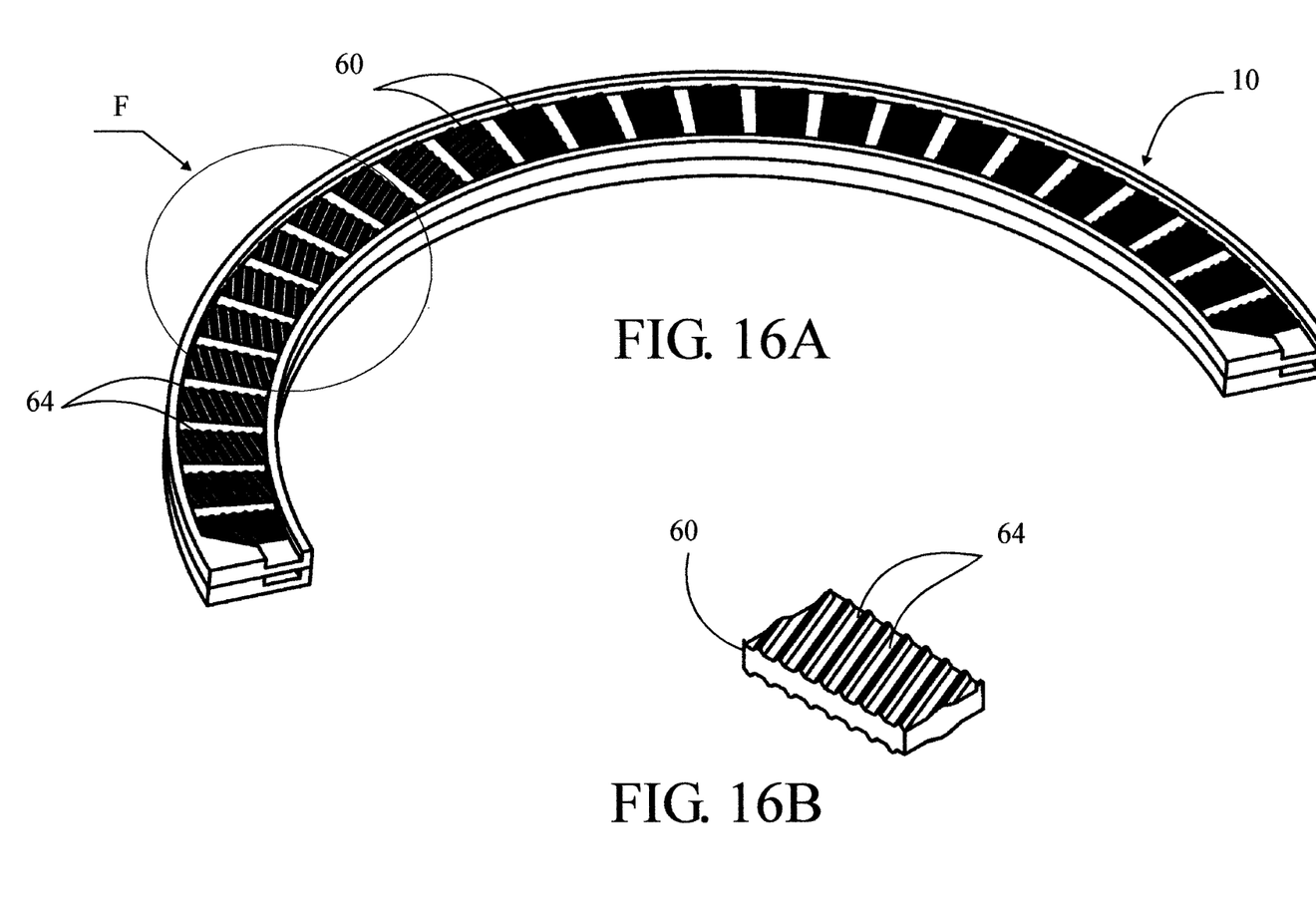
FIG. 16A is a perspective view of a thermal sector according to another implementation variant and FIG. 16B is a view of the detail F.

The thermal elements 40 may have other configurations. FIGS. 10A and 10B illustrate respectively the front and rear views of the thermal element 40 with six separate identical thermal sectors 53 extending over approximately 60°, each composed of inserts 60. In FIGS. 11A and 11B, the thermal element 40 has only two separate identical thermal sectors 53 extending over approximately 180°, each composed of inserts 60. These inserts 60 in the form of sectors of a circle can have different geometrical shapes or any shapes. They can also be replaced by strips 61 as in the example shown by FIG. 12, these strips 61 being usable in the thermal element 40 with two thermal sectors 53 as shown in FIG. 11. The inserts 60 can also be replaced by a ring 62 which is split to form interconnected inserts, or any other equivalent shape. In the same way, these different parts in magneto-calorific material 60, 61 and 62 can have flat surfaces to encourage disturbance-free fluid flow as in the insert 60 of FIG. 14 or on the other hand have on at least one of the surfaces relief features forming grooves 63 or similar forms in order to increase the exchange area with the heat transfer fluid as in the insert 60 of FIG. 15. Depending on the shape and orientation of these grooves 63 relative to the flow of fluid, perturbations can be created in order to increase the transfer coefficient. The thermal element 40 illustrated in FIG. 16A has inserts 60 with oblique grooves 64 on both faces of which the detail is given in FIG. 16B. These oblique grooves 64 create swirls in the current of fluid, commonly known as vortices.

Figures 8A, 8B, 9A, 9B:
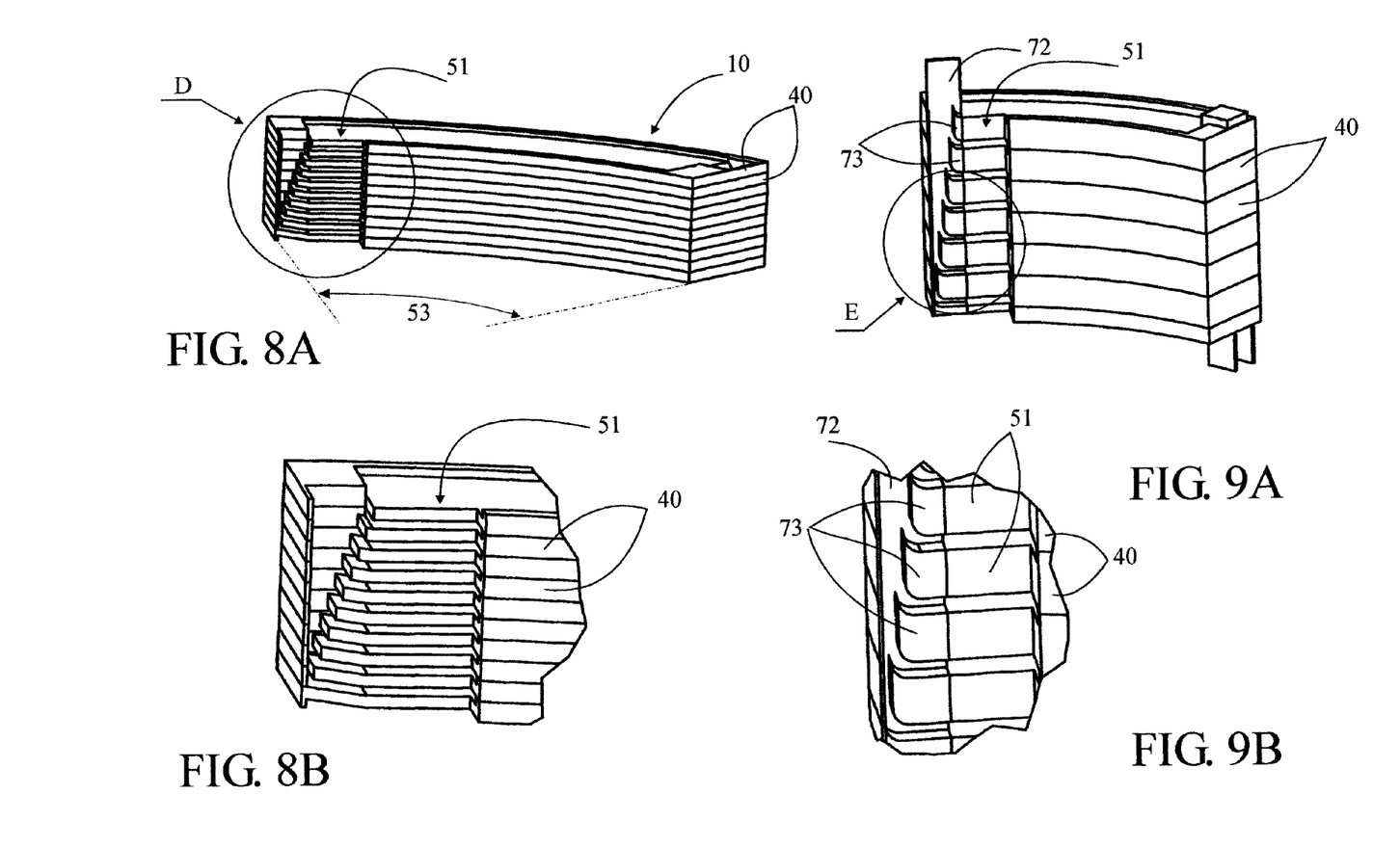
FIG. 8A is an axial sectional view of a thermal sector and FIG. 8B is a view of the detail D.
FIG. 9A is an axial sectional view of a thermal sector fitted with an insert and FIG. 9B is a view of the detail E.

In a given thermal module 10, the inlet orifices 51 and outlet orifices 52 of the channels 50 of a given collector circuit are fed in parallel. To render uniform the distribution of heat transfer fluid in the different channels 50, at least the inlet orifices 51 should preferably have a cross-section which decreases in the direction of fluid flow. This construction is represented in FIGS. 8A and 8B and allows a given volume of fluid to circulate at the same speed of flow in each of the channels 50 in order to obtain the same transfer coefficient and thus reduce energy losses. This construction however requires a different shape for each thermal element 40. Another solution consists of creating an insert 72 with orifices 73 of decreasing cross-section, this insert 72 being housed inside the inlet orifices 51 of identical cross section of the thermal elements 40, in accordance with the example illustrated in FIGS. 9A and 9B. This solution considerably simplifies the industrial production of such a construction. In addition, the insert 72 enables the thermal elements 40 to be aligned with each other and any rotation to be prevented. It is clear that these examples can be applied to the outlet orifices 52 having in this case a cross section which increases in the direction of fluid flow.

In a variant which is not represented, the thermal elements 40 of a given thermal module 10 can have an angular offset relative to each other such that the inlet orifices 51 and outlet orifices 52 are aligned not along the axis but in a helical path which facilitates the entry and exit of the heat transfer fluid into and out of the channels 50.

Figure 17A:
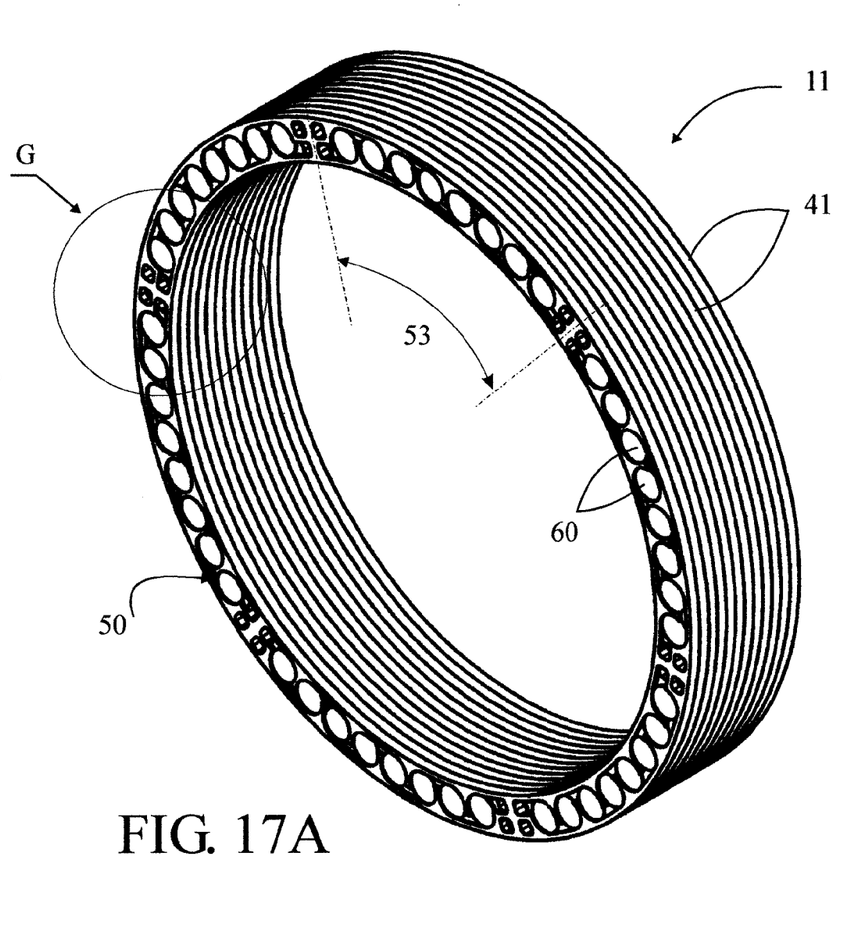
FIG. 17A is a perspective view of a first implementation variant of a thermal module according to the invention and FIG. 17B is a view of the detail G.
Figure 17B:
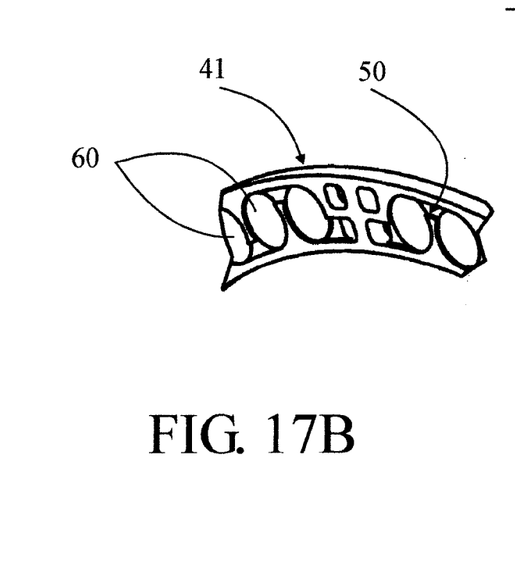
Figures 18A, 18B, 18C:
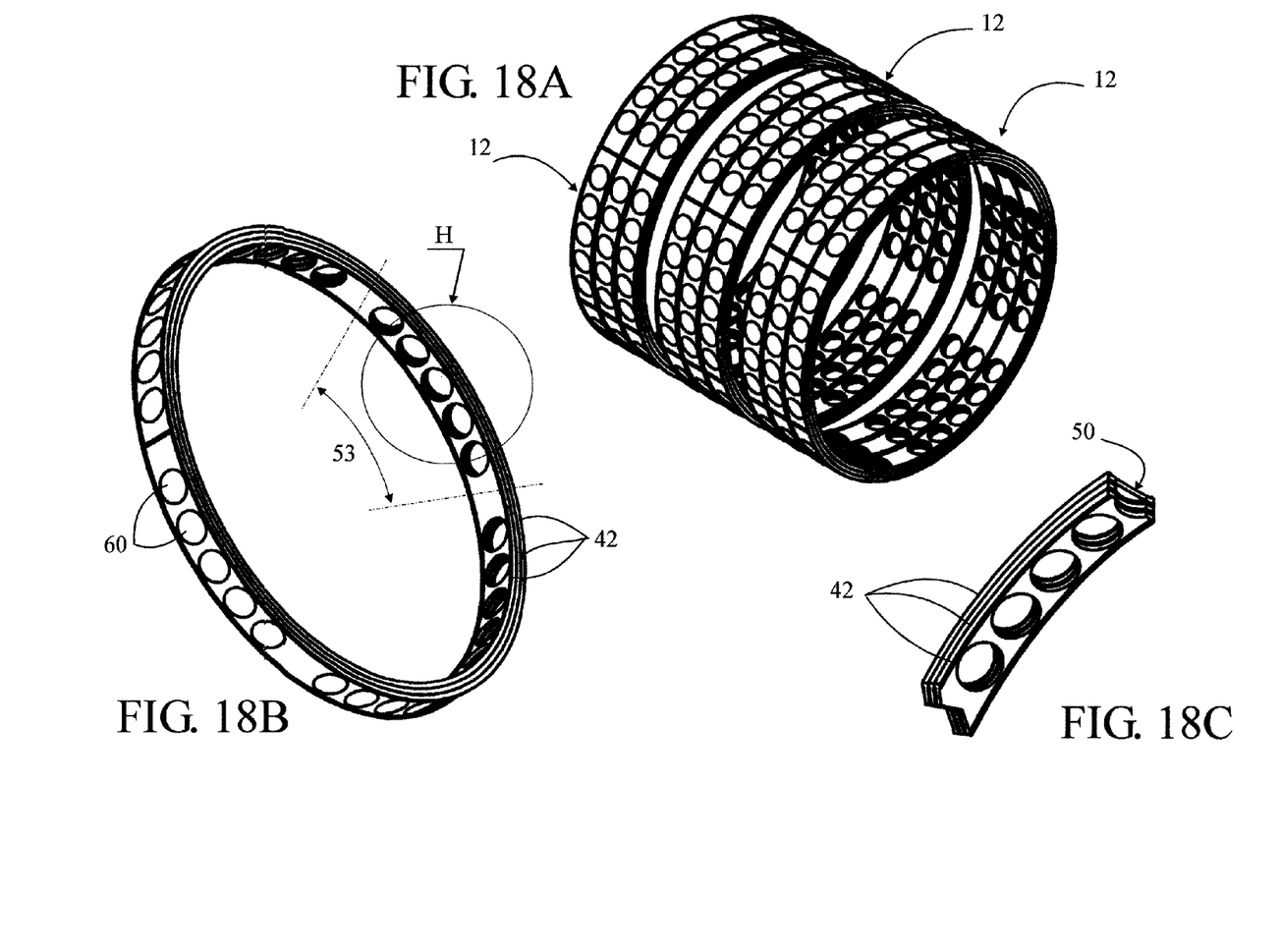
Figures 19A, 19B:
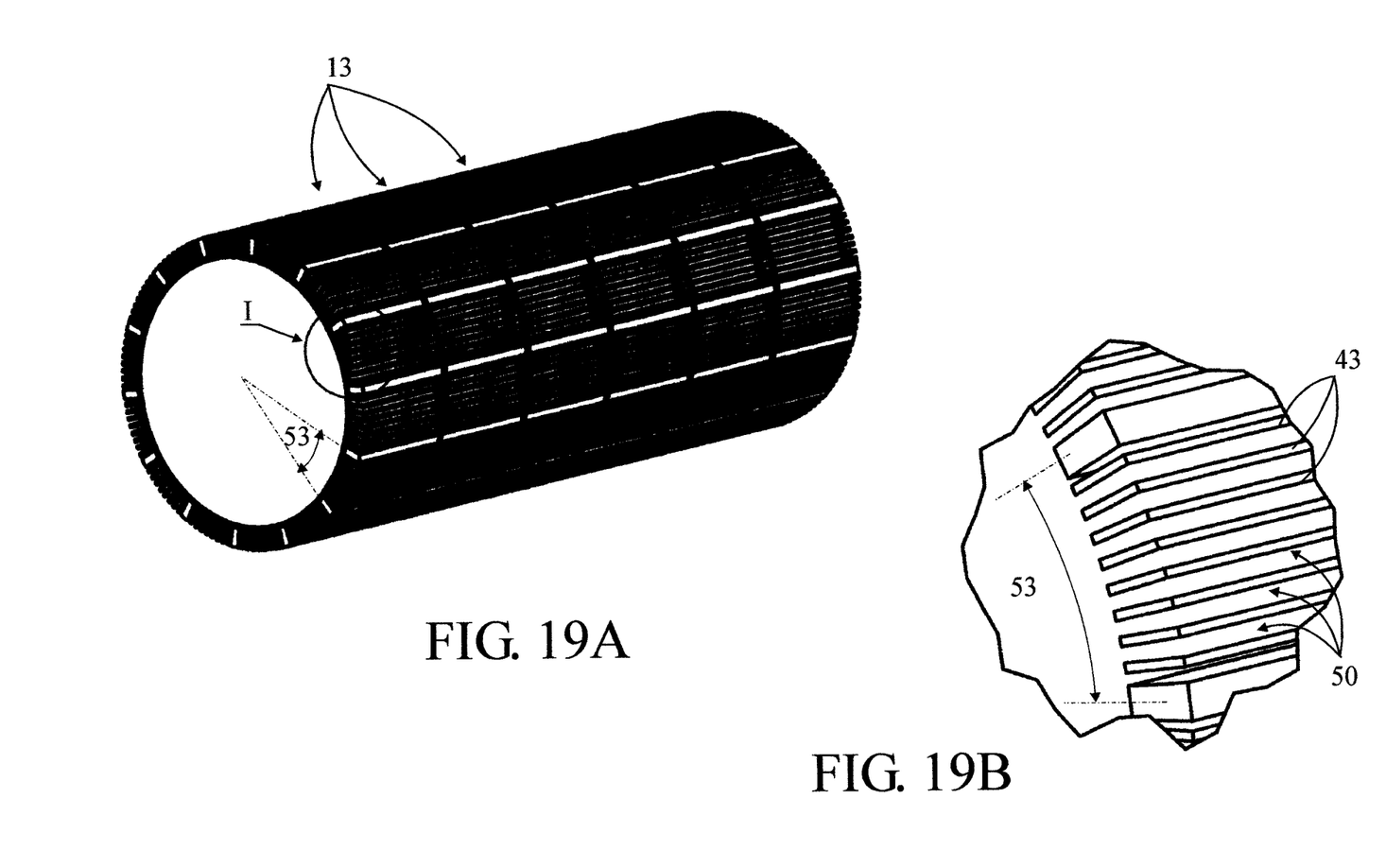
FIG. 19A is a perspective view of a third implementation variant of a thermal module according to the invention and FIG. 19B is a view of the detail I.

The thermal modules 10 can also have other constructions. The thermal module 11 illustrated in FIGS. 17A and 17B has N thermal elements 41 in the form of axially stacked flat rings. Each thermal module 11 has round inserts 60 in magneto-calorific material distributed in six thermal sectors 53, the channel 50 circulating in a zigzag fashion over these inserts 60. FIG. 18A illustrates an assembly of three thermal modules 12, each formed from three identical sub-assemblies assembled axially. One of the sub-assemblies is illustrated in FIG. 18B and comprises three thermal elements 42 in the form of concentric rings stacked radially and delimiting between each other the channels 50. Each thermal element 42 has round inserts 60 in magneto-calorific material distributed in six thermal sectors 53. This implementation variant illustrates the combination of radial stacking with axial stacking. FIG. 19A has an assembly of six identical thermal modules 13 assembled axially. Each thermal module 13 comprises fourteen identical sub-assemblies in the form of sectors of a circle and assembled side-by-side to create a cylindrical tube. A sub-assembly is detailed in FIG. 19B and comprises eight thermal elements 43 in the form of superimposed strips which delimit between each other the channels 50; each thermal element 43 can be made entirely or partly in a magneto-calorific material.

These examples are not limiting and their purpose is to illustrate the variety of possible constructions of the thermal modules 10-13, which allows the creation of an infinite range of magneto-calorific thermal generators according to the invention.

In the same way the chemical composition of the heat transfer fluid is adapted to the required temperature range and is chosen to obtain maximal heat transfer. It can be liquid, gaseous or diphasic. If it is liquid one will use for example pure water for positive temperatures and water to which an anti-freeze such as a glycolated product has been added for negative temperatures. This thermal generator 1 thus allows one to avoid the use of any fluid which is corrosive or harmful for mankind or its environment.

POSSIBLE INDUSTRIAL APPLICATIONS

All the parts comprising the thermal generator 1 according to the invention can be mass produced using repeatable industrial processes. The modular and compact design of this thermal generator 1 allows standard thermal elements 40-43 and thermal modules 10-13 to be produced, which can be combined, assembled and connected in series, in parallel or in a series/parallel combination depending on the temperature range required and the fluid flow rate for a given application. This design provides a response to a wide range of both industrial and domestic applications, at low cost and with small dimensions, offering performance unequalled by this type of generator today.

The staged structure of the thermal generator 1 effectively allows the flow of heat transfer fluid in each collector circuit to be divided several times. This staged distribution of heat transfer fluid allows the flow of fluid in each channel 50 to be divided by the same coefficient, reducing energy losses and increasing the transfer coefficient. The heat transfer area is increased by the multiplicity of the channels 50 and the transfer coefficient is correspondingly greater. In addition, the design of the thermal elements 40-43 considerably reduces the mass of inert matter in the support 70 relative to the mass of magneto-calorific material, which further improves the thermal efficiency of the generator 1 for a given size.

The present invention is not restricted to the examples of embodiment described, but extends to any modification or variant which is obvious to a person skilled in the art while remaining within the scope of the protection defined in the attached Claims.

The invention claimed is:

1. A magneto-calorific thermal generator (1) comprising:
a plurality of thermal elements (40-43) based on magneto-calorific material,
magnetic means (3) for creating a variation in a magnetic field in the plurality of thermal elements (40-43) and for varying a temperature of the plurality of thermal elements (40-43),
at least two separate collector circuits, the at least two separate collector circuits comprising a separate, dedicated "hot" collector circuit and a separate, dedicated "cold" collector circuit, in each of which circulates a separate heat transfer fluid arranged to collect respectively one of calories or frigories emitted by the plurality of thermal elements (40-43) according to a functional cycle of the respective plurality of thermal elements (40-43), and
means for connecting the at least two separate collector circuits to external circuits destined to use the calories and the frigories collected therefrom,
wherein the generator comprises at least one thermal module (10-13) comprising the plurality of thermal elements (40-43) stacked and arranged so as to define and form channels (50) between each adjacent pair of the thermal elements (40-43), and each of the channels (50) allows the circulation of the heat transfer fluid, the channels are divided into dedicated hot channels, which circulate the heat transfer fluid of the hot collector circuit, and into dedicated cold channels, which circulates the heat transfer fluid of the cold collector circuit, the hot channels and the cold channels are alternately arranged between the plurality of thermal elements (40-43) such that each thermal element (40) has, on one side, at least one of the dedicated hot channels and, on another side, at least one of the dedicated cold channels, and each of the plurality of thermal elements (40-43) have inlet orifices (51) and outlet orifices (52) for fluid which communicate so as to distribute a flow of heat transfer fluid in each hot and cold collector circuit, respectively, into the corresponding hot and cold channels (50).

2. The thermal generator (1) according to claim 1, wherein the hot and the cold channels (50) have a thickness ranging from 0.01 mm to 10 mm and each of the hot and the cold channels (50) is solely defined by mating surfaces of the adjacent pair of the thermal elements (40-43).

3. The thermal generator (1) according to claim 1, wherein the plurality of thermal elements (40-43) have recessed shapes to delimit the hot and the cold channels (50).

4. The thermal generator (1) according to claim 1, wherein the at least one thermal module (10-13) has spacer plates inserted between the plurality of thermal elements (40-43) to delimit the hot and the cold channels (50).

5. The thermal generator (1) according to claim 1, wherein the inlet orifices (51) of the plurality of thermal elements (40-43) have a decreasing cross section, in a direction of flow of the heat transfer fluid, in order to distribute the heat transfer fluid evenly within the hot and the cold channels (50).

6. The thermal generator (1) according to claim 5, wherein the inlet orifices (51) and outlet orifices (52), with variable cross section, are located in an insert (72) positioned across the plurality of thermal elements (40-43).

7. The thermal generator (1) according to claim 1, wherein the outlet orifices (52) of the plurality of thermal elements (40-43) have an increasing cross section, in a direction of flow of the heat transfer fluid, in order to collect the heat transfer fluid together before exiting the thermal module.

8. The thermal generator (1) according to claim 1, wherein the plurality of thermal elements (40-43) are offset relative to one another such that the inlet orifices (51) and the outlet orifices (52) are aligned in a helical path.

9. The thermal generator (1) according to claim 1, wherein the at least one thermal module has a rectilinear configuration and the plurality of thermal elements are linear and stacked one of horizontally, vertically and both in a horizontal and vertical combination.

10. The thermal generator (1) according to claim 1, wherein the at least one thermal module has a circular configuration and the thermal elements (40-43) are annular and stacked one of axially, radially and in both an axial and radial combination.

11. The thermal generator (1) according to claim 10, wherein the thermal generator (1) comprises at least one of an inner sleeve (4) and an outer sleeve (5) arranged to seal the at least one thermal modules (10-13).

12. The thermal generator (1) according to claim 10, wherein the thermal generator (1) comprises internal magnetic assemblies (3) carried by a shaft (2) driven in one of rotation and translation and an outer armature (6) arranged to close the magnetic flux generated by the magnetic assemblies (3).

13. The thermal generator (1) according to claim 10, wherein the thermal generator (1) comprises internal and external magnetic assemblies (3), at least one of these magnetic assemblies (3) is carried by a shaft (2) driven one of rotationally and translationally.

14. The thermal generator (1) according to claim 1, wherein the plurality of thermal elements (43) are at least partially formed from a magneto-calorific material.

15. The thermal generator (1) according to claim 14, wherein the parts (60-62) of the magneto-calorific material have smooth surfaces.

16. The thermal generator (1) according to claim 14, wherein the parts (60-62) of the magneto-calorific material have relief features on at least one face thereof.

17. The thermal generator (1) according to claim 16, wherein at least one of the face, with relief features, has grooves (63, 64) arranged to create swirls in the heat transfer fluid.

18. The thermal generator (1) according to claim 1, wherein the plurality of thermal elements (40-42) comprise one or more parts (60-62) of a magneto-calorific material carried by a support (70).

19. The thermal generator (1) according to claim 18, wherein the support (70) is overmoulded around the parts (60-62) of the magneto-calorific material.

20. The thermal generator (1) according to claim 18, wherein the parts (60) in magneto-calorific material are inserts of a geometrical shape or a shape of a sector of a circle.

21. The thermal generator (1) according to claim 18, wherein the support (70) is made from a thermally insulating material.

22. The thermal generator (1) according to claim 21, wherein the thermally insulating material is filled with particles of thermally conducting material.

23. The thermal generator (1) according to claim 1, wherein the plurality of thermal elements (40-43) are divided into at least two separate thermal sectors (53), and each has at least one of a hot channel and a cold channel (50) fed by an inlet orifice (51) and an outlet orifice (52).

24. The thermal generator (1) according to claim 23, wherein the inlet orifices (51) and the outlet orifices (52) of the thermal sectors (53), of a given thermal element (40-43), are one of connected in series, in parallel and in a series/parallel combination to one of the hot and cold collector circuit corresponding to the thermal sector.

25. The thermal generator (1) according to claim 1, wherein the thermal generator comprises at least two thermal modules (10-13), and the hot and cold collector circuits of the thermal modules are connected one of in series, in parallel and in series/parallel combination by distributor discs (20).

26. The thermal generator (1) according to claim 1, wherein the thermal generator (1) comprises sealing flanges (30) arranged to close the hot and the cold channels (50) of the thermal elements (40-43) and which mechanically maintain the thermal elements (40-43) together, and the sealing flanges (30) have feed orifices (31) and discharge orifices (32) to connect the hot and the cold collector circuits to the external circuits.

27. The thermal generator (1) according to claim 1, wherein the heat transfer fluid is one of a liquid, a gaseous or a diphasic.

* * * * *